US012252257B2

(12) United States Patent
Kasher

(10) Patent No.: US 12,252,257 B2
(45) Date of Patent: Mar. 18, 2025

(54) PARACHUTE WITH INFLATION CONTROL AND LOAD DISTRIBUTING SLIDER LOOPS

(71) Applicant: Cirrus Design Corporation, Duluth, MN (US)

(72) Inventor: Anthony D. Kasher, Duluth, MN (US)

(73) Assignee: Cirrus Design Corporation, Duluth, MN (US)

( * ) Notice: Subject to any disclaimer, the term of this patent is extended or adjusted under 35 U.S.C. 154(b) by 313 days.

(21) Appl. No.: 17/809,103

(22) Filed: Jun. 27, 2022

(65) Prior Publication Data

US 2023/0415901 A1 Dec. 28, 2023

(51) Int. Cl.
| B64D 17/24 | (2006.01) |
| B64D 17/02 | (2006.01) |
| B64D 17/16 | (2006.01) |
| B64D 17/18 | (2006.01) |

(52) U.S. Cl.
CPC ........... *B64D 17/025* (2013.01); *B64D 17/16* (2013.01); *B64D 17/18* (2013.01); *B64D 17/24* (2013.01)

(58) Field of Classification Search
CPC .............................. B64D 17/18; B64D 17/343
See application file for complete search history.

(56) References Cited

U.S. PATENT DOCUMENTS

| 2,164,122 A | 6/1939 | Pool | |
| 2,356,493 A | 8/1944 | Smith | |
| 7,293,742 B2* | 11/2007 | Sadeck | B64D 17/343 |
| | | | 244/142 |
| 7,997,535 B2* | 8/2011 | Babovka | B64D 17/18 |
| | | | 244/145 |
| 8,100,365 B2 | 1/2012 | Fleming, III | |
| 10,118,707 B2 | 11/2018 | Homan et al. | |
| 10,399,686 B2 | 9/2019 | Homan et al. | |
| 10,414,506 B2 | 9/2019 | Homan et al. | |
| 10,717,538 B2 | 7/2020 | Homan et al. | |
| 2001/0050323 A1* | 12/2001 | Brownell | B64D 17/24 |
| | | | 244/142 |

FOREIGN PATENT DOCUMENTS

| CN | 107618669 A | 1/2018 |
| WO | WO-2024006118 A2 | 1/2024 |
| WO | WO-2024006118 A3 | 1/2024 |

OTHER PUBLICATIONS

"Application Serial No. PCT/US2023/025758, Invitation to Pay Additional Fees mailed Dec. 22, 2023", 4 pgs.
"International Application Serial No. PCT/US2023/025758, International Search Report mailed Mar. 14, 2024", 5 pgs.

(Continued)

*Primary Examiner* — Justin M Benedik
(74) *Attorney, Agent, or Firm* — Schwegman Lundberg & Woessner, P.A.

(57) ABSTRACT

Disclosed herein are parachute canopies and sliders for use with parachutes. The parachute canopies can include one or more deformable vent panels that can be used to control an inflation rate of the canopies based on an internal pressure within the canopies. The sliders can include strips that form through holes that have a width that distributes a radial load on suspension lines and allow for the use of lower weight, high modulus suspension lines.

10 Claims, 14 Drawing Sheets

(56) References Cited

OTHER PUBLICATIONS

"International Application Serial No. PCT/US2023/025758, Written Opinion mailed Mar. 14, 2024", 9 pgs.

U.S. Appl. No. 15/431,689 U.S. Pat. No. 10,118,707, filed Feb. 13, 2017, Aircraft Parachute Deployment Autopilot.

U.S. Appl. No. 15/431,685 U.S. Pat. No. 10,399,686, filed Feb. 13, 2017, Mechanical Timing Connection for Sequencing Airbag Activation with Rocket for Deploying Aircraft Parachute.

U.S. Appl. No. 15/431,688 U.S. Pat. No. 10,717,538, filed Feb. 13, 2017, Bridle for Aircraft Parachute Deployment Rocket.

U.S. Appl. No. 15/431,687 U.S. Pat. No. 10,414,506, filed Feb. 13, 2017, Aircraft Parachute System Utilizing Airbag to Assist with Parachute Deployment.

U.S. Appl. No. 62/294,399, filed Feb. 12, 2016, Aircraft Parachute System.

U.S. Appl. No. 15/836,885 RE47,474, Dec. 10, 2017, Intelligent Ballistic Parachute System that Performs Pre-Activation and/or Post-Activation Actions.

U.S. Appl. No. 16/422,357 U.S. Pat. No. 8,100,365, Feb. 10, 2009, Intelligent Ballistic Parachute System that Performs Pre-Activation and/or Post-Activation Actions.

U.S. Appl. No. 15/836,885 U.S. Pat. No. 8,056,861, Feb. 10, 2009, Intelligent Ballistic Parachute System that Performs Pre-Activation and/or Post-Activation Actions.

\* cited by examiner

PARACHUTE WITH INFLATION CONTROL AND LOAD DISTRIBUTING SLIDER LOOPS

CROSS-REFERENCE TO RELATED APPLICATIONS

The present application relates to U.S. Pat. No. 10,118,707 entitled Aircraft Parachute Deployment Autopilot and filed on Feb. 13, 2017, U.S. Pat. No. 10,399,686 entitled Mechanical Timing Connection for Sequencing Airbag Activation with Rocket for Deploying Aircraft Parachute and filed on Feb. 13, 2017, U.S. Pat. No. 10,414,506 entitled Aircraft Parachute System Utilizing Airbag to Assist with Parachute Deployment and filed on Feb. 13, 2017, and U.S. Pat. No. 10,717,538 entitled Bridle for Aircraft Parachute Deployment Rocket and filed on Feb. 13, 2017, each of which claim priority to U.S. Provisional Patent Application No. 62/294,399 entitled Aircraft Parachute System and filed on Feb. 12, 2016. The present application also relates to U.S. Reissue Patent RE47,474 entitled Intelligent Ballistic Parachute System that Performs Pre-Activation and/or Post-Activation Actions and filed on Jul. 2, 2019 as a reissue application of U.S. Pat. No. 8,100,365. The present application also relates to U.S. patent application Ser. No. 16/422,357, which is a continuation of application Ser. No. 15/836,885, which resulted in RE47,474. The content of each of the above-referenced patents, reissue patents, applications, reissue applications, provisional applications or other referenced case is hereby incorporated by reference in its entirety.

FIELD OF THE DISCLOSURE

The present subject matter relates to parachutes. More specifically, the present disclosure relates to mechanisms for controlling parachute disreefing and loops for use with sliders on parachutes.

BACKGROUND

Parachutes are used to slow objects by increasing the drag forces on objects in motion. This can be achieved by increasing the surface area of material, which, in turn, increases the resistance to an object's motion. The objects can be falling through the sky or moving along a surface. For example, parachutes may be used by skydivers and the military to drop equipment and/or supplies from planes and may be used to slow vehicles used in drag racing. Depending on the application, controlling the rate at which a parachute opens, known as reefing/disreefing, can be useful. That is, parachutes may be reefed to prevent them from fully opening too quickly. Reefing of a parachute may help avoid subjecting the parachute canopy to excessive air loads and/or the payload to excessive forces from fully deploying the parachute at high airspeed, which may impart large shocks to the parachute system and rigging or payload being delivered.

Reefing a parachute may involve using an annularly shaped slider on the suspension lines extending from the parachute skirt to the payload. The suspension lines may pass through a peripheral portion of the slider by way of a metal ring or grommet in the slider. The slider may be placed near the skirt of the parachute when packed such that it may restrict the diameter of the suspension lines and the skirt of the parachute upon initial opening, but may slide down the suspension lines and away from the skirt of the parachute thereafter allowing the skirt to expand and the parachute to fully open. The size (e.g., diameter or other crossing dimension) of the slider in addition to its surface area may often be selected prior to use depending on the anticipated parachute deployment conditions. That is, a high-speed, high-altitude deployment may suggest a smaller diameter slider with a relatively large surface area (e.g., small diameter slider with a small slider vent) to limit the initial skirt size, limit loads on the payload upon initial opening, and slowly slide down the suspension lines. In contrast, a low-speed, low-altitude deployment may suggest a larger diameter slider with a relatively small surface area (e.g., large diameter slider with large slider vent) since loads on the payload are less of a concern and because a faster opening parachute may be desired.

While the deployment conditions of a parachute may often be anticipated such that the appropriate amount of reefing can be selected prior to use, the conditions when deploying a parachute may not always be known prior to preparation of the parachute. Moreover, finding lighter weight components is a continuous goal in aviation or other airborne technologies or activities, but identifying lightweight designs with sufficient strength can be difficult.

SUMMARY

Disclosed herein are parachute canopies and sliders for use with parachutes. The parachute canopies can include one or more vents that can be used to control an inflation rate of the canopies based on an internal pressure within the canopies and, as such, may provide for a wide range of deployment conditions. The sliders can include flexible loops that distribute radial loads on suspension lines and allow for the use of lower weight, high modulus suspension lines.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
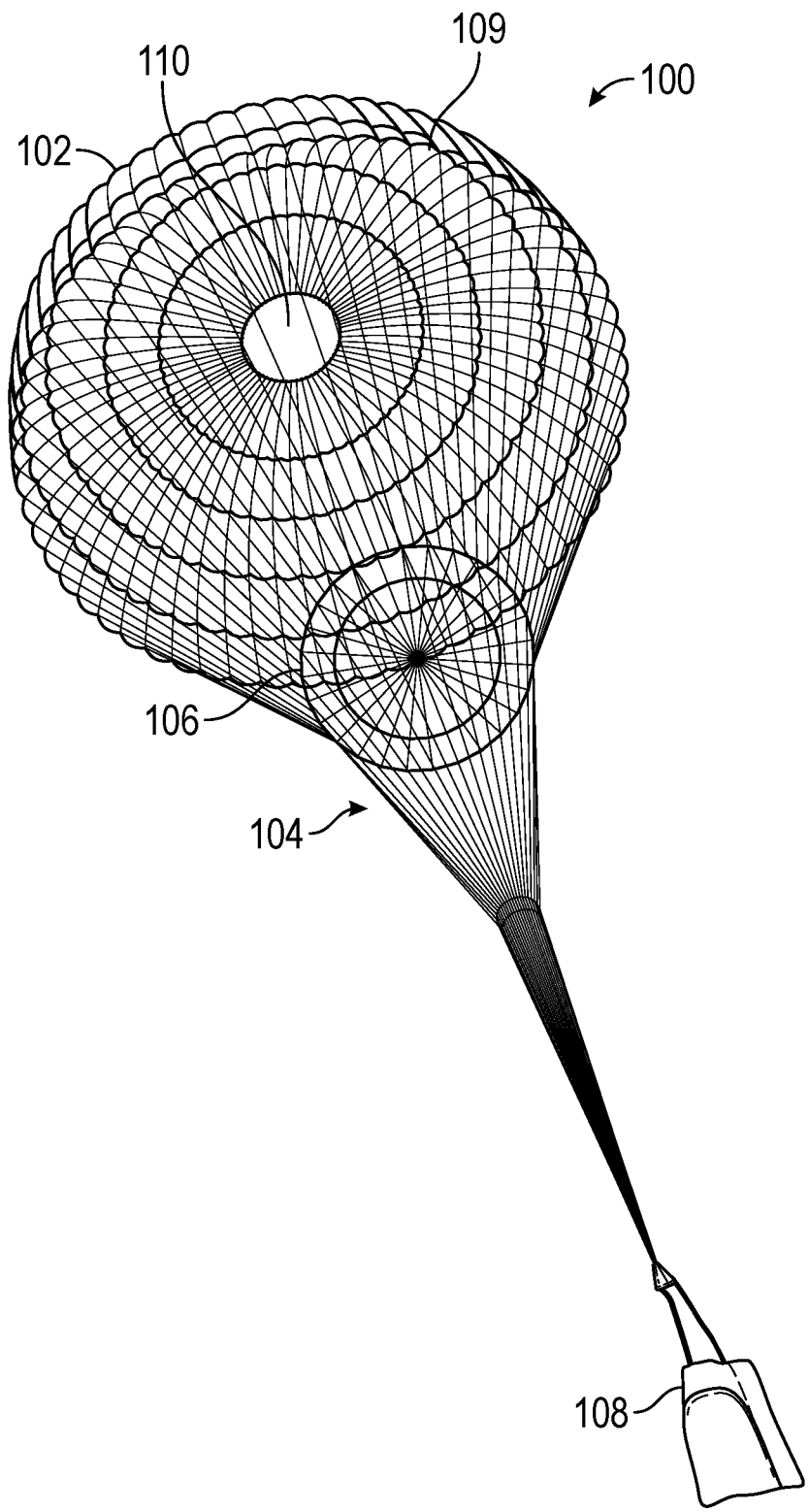
FIG. 1 shows a parachute system in accordance with at least one example of this disclosure.

Several solutions are disclosed herein to address the issues mentioned above. In particular, with respect to lacking knowledge of deployment conditions prior to parachute preparation, a parachute that adjusts to accommodate deployment conditions may be provided. For example, the inflation rate of a parachute may depend on the relative size of the slider vent and a vent in the top of the parachute canopy. That is, if the slider and its corresponding vent is relatively large and the canopy vent is relatively small, a large volume of air will enter the bottom of the parachute and very little will escape out of the canopy vent causing the parachute to inflate very quickly. In contrast, if the slider vent is relatively small and the canopy vent is relatively large, less air will enter the parachute and more will escape out of the canopy vent causing the parachute to inflate less quickly. As mentioned, slider size has heretofore been adjusted prior to parachute preparation to control disreefing, but that does not allow for on-the-fly or automatic adjustment of the disreefing rate. Rather than focus on slider size, the present disclosure provides for on-the-fly automatic adjustment of canopy venting size and/or area to control the inflation rate of the parachute. In short, if the deployment speed is high and internal pressures within the parachute are, thus, high, the canopy vent area may automatically increase to slow the otherwise pre-defined disreefing rate. This works to both reduce the parachute inflation rate and reduce the shock received on the payload upon initial deployment of the parachute system. However, if the deployment speed is low and internal pressures within the parachute are, thus, low, the canopy vent area may be maintained to follow the pre-defined disreefing rate. In some examples, multiple stages of canopy vent area adjustment may be provided to accommodate a wider range of deployment speeds.

With respect to lighter weight materials, industry demands call for lessening the overall weight of parachute systems and applicant has endeavored to modify low modulus suspension lines to something lighter such as high modulus suspension lines. These lines have a high tensile strength and a much lower elongation (e.g., 2-3% vs. 30%) at break loads. However, upon testing, applicant realized that these high modulus lines tended to break due to the lateral forces imparted on them by the slider and, in particular, the industry standard metal grommets in the slider that provide the opening through which the suspension lines pass. The present application discloses a load distributing line guide on the slider that allows for use of the high modulus suspension lines without breaking. That is, the load distributing line guide replaces the metal ring or grommet in the peripheral portion of the slider. In one or more examples, the load distributing line guide includes a flexible textile loop. In other examples, different types of load distributing line guides may be provided. In any of these cases, the lighter weight, high modulus suspension lines, may pass through or across the load distributing line guides and may bend around the guides without breaking.

The above discussion is intended to provide an overview of subject matter of the present patent application. It is not intended to provide an exclusive or exhaustive explanation of the invention. The description below is included to provide further information about the present patent application.

Turning now to the figures, FIG. 1 shows a parachute system 100 in accordance with at least one example of this disclosure. The parachute system may be a collapsible system configured to be selectively deployed to decrease and/or control the fall rate of a falling object. The parachute system 100 may include a canopy 102, suspension lines 104, and a slider 106. The suspension lines 104 may connect canopy 102 to a payload 108 to suspend the payload from the canopy. Examples of payload 108 may include, but are not limited to, an aircraft, a person, equipment, vehicles, food, supplies, and other falling objects.

Figure 2A:
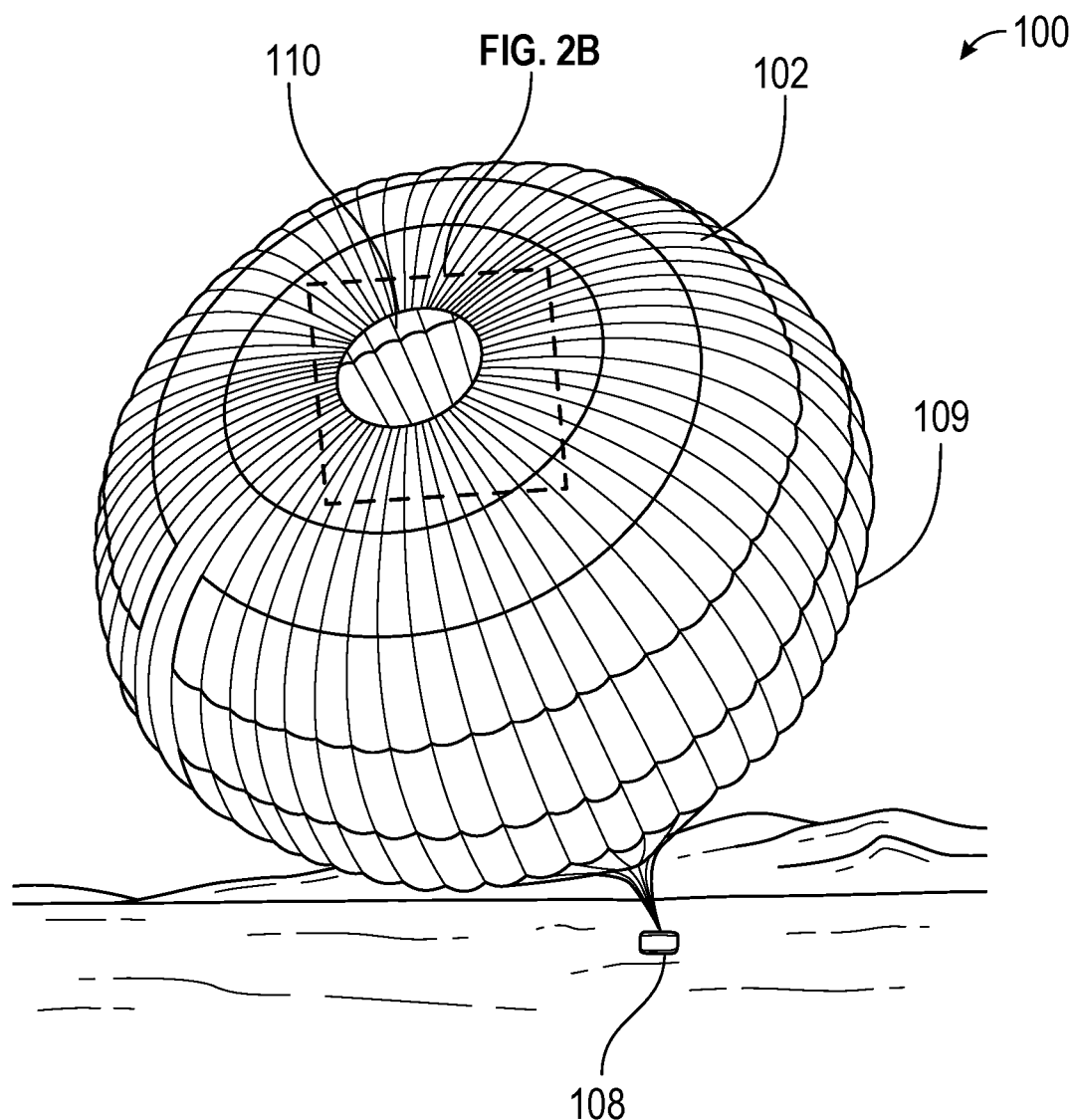
FIG. 2A shows a canopy of the parachute system of FIG. 1, in accordance with at least one example of this disclosure.

The canopy 102 is shown in FIG. 1 and again from a top side in FIG. 2A. As shown, the canopy 102 may be a collapsible component that is configured to open into a dome or umbrella shape during deployment. The shape of the canopy 102 may be configured to capture and retain air as the canopy is pulled through the air such that internal pressures acting outward on the canopy function to resist the forces pulling on the canopy. The canopy may include a generally continuous textile fabric forming the dome or umbrella shape when open and defining a containment space within the dome. The generally continuous textile may be made up of one or more panels or sections that are sewn together to form the canopy. The canopy may define a skirt or rim 109 along a peripheral bottom edge and may include a main vent 110 near the apex of the deployed dome or umbrella shape. The main vent 110 may be sized relative to the overall size of the canopy to release air from the containment space of the canopy and provide stability to the parachute system. In other examples, rather than a main vent 110, multiple smaller vents may be provided. It is to be appreciated that while a generally round and/or spherical canopy has been shown, other shapes including triangular, square, rectangular, or other shapes may be provided. The canopy may include and/or be made from polyamides such as, for example, ripstop nylon. Still other canopy materials may be provided such as an aromatic polyester (trade name VECTRAN™) or ultra-high molecular weight polyethylene fibers (trade names SPECTRA® and/or DYNEEMA®).

With continue reference to FIGS. 1 and 2A, the suspension lines 104 are shown. The suspension lines 104 may be configured for secured coupling to a payload 108 and for securing coupling to the canopy 102. In one or more examples, the suspension lines 104 may extend along the canopy 102 and be integrated into the canopy to reinforce the canopy while also distributing the tensile loads of the suspension lines along the canopy. The suspension lines may be low modulus lines such as polyamide material (trade name NYLON®) or other low modulus lines or the suspension lines 104 may be high modulus lines such as polyparaphenylene terephthalamide (trade name KEVLAR®), an aromatic copolyimide (trade name TECHNORA®), or an aromatic polyester (trade name VECTRAN™). Still other materials for the suspension lines may be provided and/or selected based on considerations of tensile strength, weight, and/or other factors. The suspension lines may be sized to accommodate deployed tensile loads, packing requirements and other considerations. In one or more examples, the suspension lines may have multiple stages separated by staging rings to control the number of lines coming together. As shown in FIG. 1, for example, a 2-stage system having a staging ring between the lower stage and the upper stage may be provided. This staging ring may allow for fewer lines to be used as the several lines converge toward a common attachment point, for example.

The slider 106 may be configured to control the radial position of the suspension lines 104 and, as such, control the disreefing rate of the parachute. As shown, the slider 106 may include an annular or circular element or body arranged along the length of the suspension lines 104. The slider may be a collapsible fabric element that opens to an annular or circular shape when the parachute is deployed. It is to be appreciated that while an annular or circular shape is described, the slider shape may be coordinated with and/or match the canopy shape. Moreover, annular in this context may simply include an open central portion and may not be limited to circular shapes. (e.g., a rectangular slider with a rectangular opening may be considered annular). In some examples, the shape of the slider may be the same or similar to the canopy shape. The slider 106 may have a peripheral edge where it interacts with the suspension lines 104 and may have one or more tensile members extending across the width of the slider to control radially outward forces placed on the slider by the suspension lines. Alternatively or additionally, the slider may rely on hoop stresses in the slider to contain or resist the radially outward forces. In one or more examples, the slider may include suspension line interfacing elements that engage the suspension lines 104 and provide for sliding of the slider along the suspension lines. In one or more examples, as discussed above, the suspension line interfacing elements may include metal grommets or rings. In still other examples, the suspension line interfacing elements may include load distributing line guides as discussed in more detail below.

Inflation Control

Figure 2B:
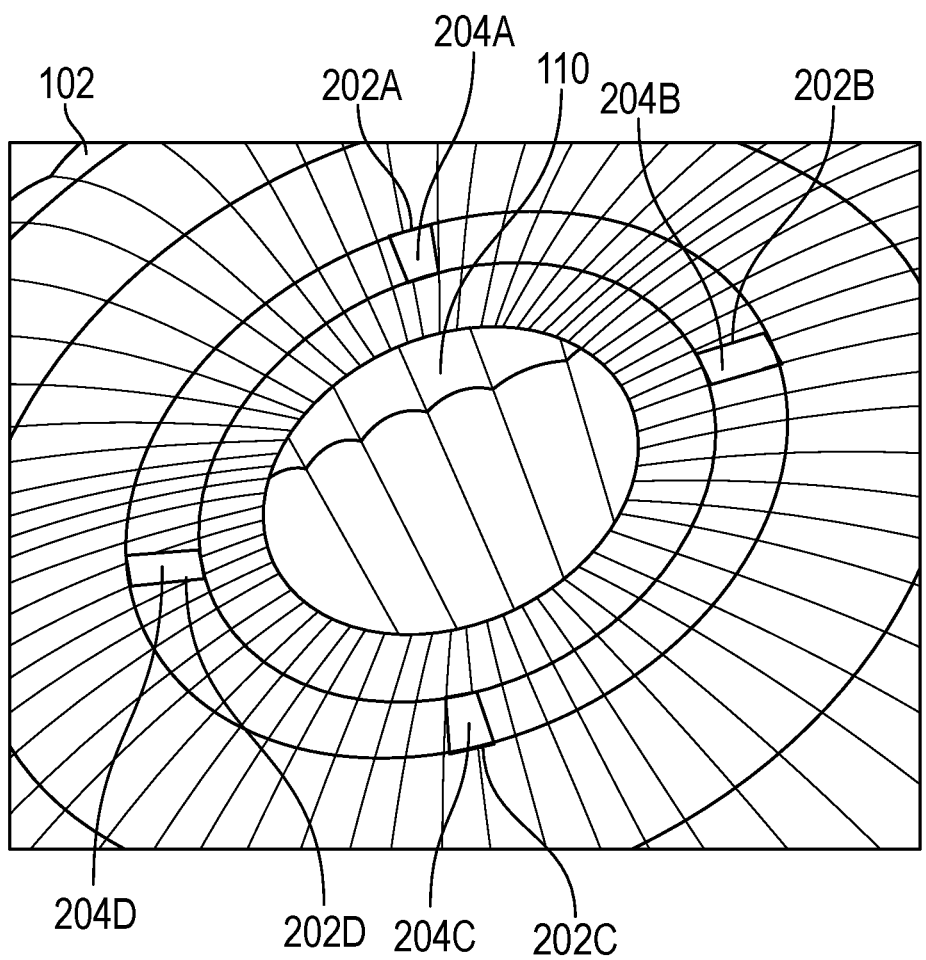
FIG. 2B shows a close-up view thereof.

As discussed, the canopy system may be configured for on-the-fly and/or automatic adjustment of the canopy venting size to control parachute inflation based on deployment conditions. As shown in FIG. 2B, and in addition to main vent 110, the canopy may include one or more vents or openings 202 (labeled individually as vent 202A, 202B, 202C, and 202D). Each of vents 202 has a perimeter that defines a size and shape of the respective vent 202 and a resulting open area in the canopy 102. While shown as having approximately the same size and shape in FIG. 2B, each of vents 202 can have a different size and/or shape. The sizes and shapes of vents 202 can be a function of the application, canopy size, main vent size, expected inflation rate for the canopy, expected payload capacity and/or expected payload speed at time of deployment. For example, the sizes and shapes of vents 202 used in a parachute for a skydiver may be different than those used in a parachute connected to an aircraft as part of an arresting system for the aircraft. In one or more examples, the vents 202 may be arranged in the field of the canopy 102 and the edges of the vents 202 may be aligned with, and the vents sized to accommodate, canopy panels or sections. That is, the edges may be aligned with suspension lines 104 or other canopy reinforcing lines or stitching in the canopy pattern. As shown, the vents may be relatively rectangular and may result from removal of a portion or section of the canopy, for example. In other examples, any shape may be provided such as round, triangular, square, or another shape. Still further, reinforcing stitching, hems, or other fabric reinforcing techniques may be used to reinforce the peripheral edge of the vents and provide for resistance to deformation or tearing of the canopy at or around the vent. As shown, four vents in addition to the main vent may be provided. Alternatively, 1 additional vent, 2 additional vents, 3 additional vents, 5 additional vents, 6 additional vents or any other number of additional vents may be provided.

Panels 204 (labeled individually as panels 204A, 204B, 204C, and 204D) may be attached to canopy 102 and completely or partially cover vents 202. Panels 204 may be made of a different fabric or the same fabric as canopy 102. For example, canopy 102 may be made of a first material and panels 204 may be made of a second, distinct material that is not otherwise a component of canopy 102. Panels 204 can then be attached to canopy 102 to at least partially cover vents 202 in a separable or openable fashion as disclosed herein. For instance, panels 204 may have a first end, a second end, a first side, and a second side that are attached to canopy 102 using a breakaway stitch that may deform (e.g., stretch of fracture) based on a particular pressure across the panel resulting from a particular speed of the parachute through the air. In one or more examples, the breakaway stitch may be provided on a single edge opposite a non-breaking stitch and the remaining edges may not include stitches such that when the panel breaks away, it opens as a flap and remains attached. Still other approaches to stitching or attaching the panels 204 may be provided such as providing different approaches for some panels as compared to others.

As an example, panels 204A and 204C may be attached to canopy 102 with a first thread and/or stitch type. Panels 204B and 204D may be attached to canopy 102 with a second thread and/or stitch type. The first thread and/or stitch type and the second thread and/or stitch type may break at different tensile loads. That is, the first thread may have a first diameter and/or be made of a first material that may fracture, for example, when subjected to X pounds of tension. The second thread may have a second diameter and/or be made of a second material that may fracture more easily, for example, when subjected to Y pounds of tension. The first diameter may be larger than the second diameter and the X pounds of tension needed to cause fracturing may be greater than the Y pounds needed to cause fracturing of the second thread. Thus, panels 204B and 204D may separate from canopy 102 before panels 204A and 204C because the second thread and/or stitch type may deform before the first thread and/or stitch type or portions of each panel may separate depending on how they are stitched to the canopy. Still further, a same stitch material and/or diameter may be provided across all of the panels, but the stitch pattern may be adjusted to provide for variability in the strength of the attachment to allow for variability in the strength of the attachment (e.g., more stitches per square inch or rows or stitches etc. or stitch pattern such as straight, zig-zag stitching, double or triple throw stitching, etc.) and, thus, variability in the loading under which the panels may break away from the canopy, open, or otherwise deform and expose all or a portion of the vent area to air flow.

In still another example, panels 204 may be made of a lighter weight fabric than the canopy of the parachute and may be designed to rip, tear, or otherwise deform under particular loading conditions. That is, rather than providing a breakaway stitch, the stitch may be designed to hold and the fabric may be designed to deform. In one or more examples, the fabric of the panels 204 may be the same material type as the canopy, but be a lighter weight material and, as such, may have a lower tensile or other tearing strength than the canopy material. In one or more other examples, a different material may be provided that has a lower tensile or other tearing strength than the canopy material.

Figure 3A:
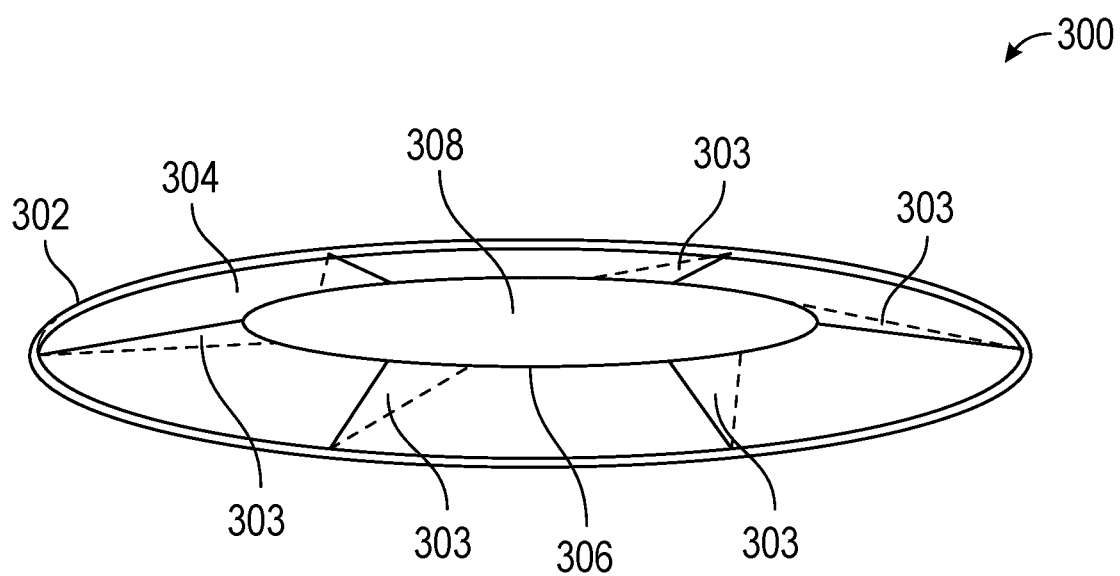
FIG. 3A shows a vent panel in a closed position, in accordance with at least one example of this disclosure.
Figure 3B:
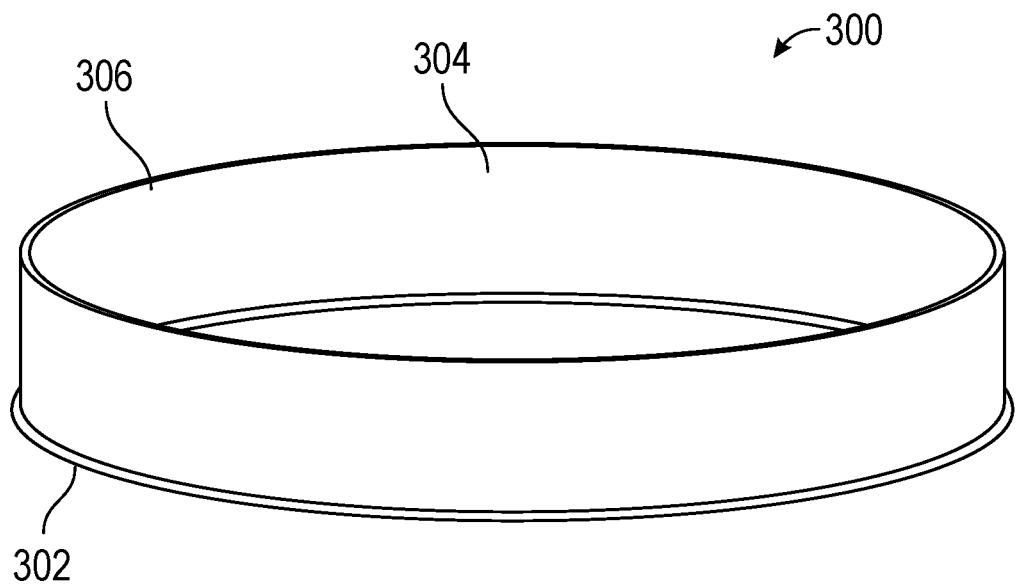
FIG. 3B shows the vent panel of FIG. 3A in an open condition, in accordance with at least one example of the present disclosure.

Referring now to FIGS. 3A and 3B, panel 300 may be provided as an alternative to or in addition to having vents/panels 202/204 in the field of the canopy. FIG. 3A shows panel 300 in a closed position, while FIG. 3B shows panel 300 in an open position. As shown, panel 300 may be incorporated into the main vent 110 and may be configured to increase the open area of the main vent 110 under particular conditions. That is, the panel 300 may reduce the open area of the main vent 110 when installed, but under particular conditions, the panel 300 may open to increase the open area of the main vent 110. As shown, a first perimeter 302 of the panel 300 can be attached to the canopy 102 at the perimeter of opening 110 such that a material 304 covers at least a portion of opening 110. As discussed with respect to panels 200, the panel 300 material 304 may be the same material as the canopy or a different material may be used. It is to be appreciated that during manufacturing and based on design factors, the size of the main vent 110 may be adjusted to accommodate the panel 300. Moreover, while described as being incorporated into the main vent 110, the panel 300 can be used on other vents.

Figure 3C:
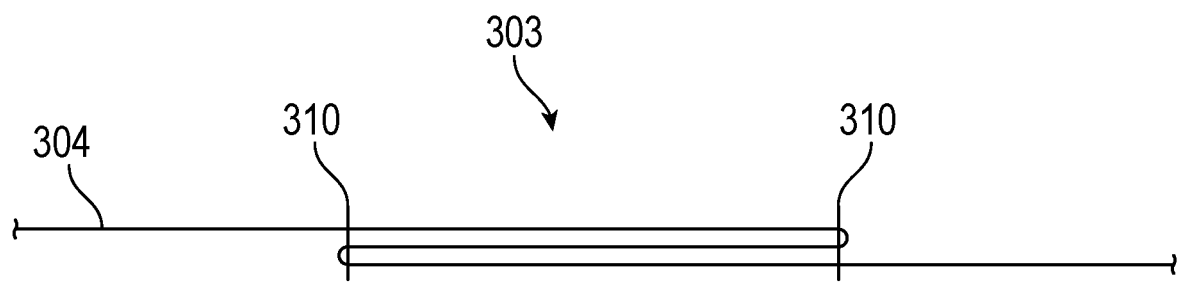
FIG. 3C shows a cross-sectional view of an overlapping and stitched portion of the closed vent panel of FIG. 3A, in accordance with at least one example of this disclosure.

FIG. 3A shows panel 300 in a first, closed, or undeployed state. As shown and in the first state, the panel 300 may have an annular shape and may include a second perimeter 306 forming an opening 308 having an area smaller than the open area of the main vent 110. Depending on the purpose of the vent, the panel 300 may fully occlude the vent and may not include opening 308. To retain panel 300 in the first state, portions 303 of material 304 may overlap one another and may be stitched together via one or more stitches 310 as shown in FIG. 3C. The stitches may be designed to break or breakaway when a particular load is applied to the surface of the material 304. When the stitches break or breakaway, the panel 300 may transition to the second, open, or deployed state shown in FIG. 3B. That is, the panel may transition to a cylindrical or tube shape in the deployed state. The strength of the stitch material may be selected to provide for opening of the panel 300 at a particular internal pressure of the canopy 102.

In one or more examples, the stitching of the overlapping portions 303 near the perimeter of the panel 300 may be stronger than the stitching of the overlapping portions near the open area 308. That is, various stages of stitching may be provided along the overlapping portions where the stitching gets weaker as the stitching approaches the center. In this example, an inner portion of the panel 300 may open while a more radially outward portion of the panel may remain intact. In this way, the opening of the panel 300 may be staged providing for a wider range of conditions and resulting panel openings. Like the panels 200, the stitching may be stronger or weaker depending on stitch material, stitch thickness, and/or stitch pattern.

It is to be appreciated that while a closed and openable panel 300 has been described, and as discussed with respect to panels 202, the material of the panel 300 may be a lighter weight material than the canopy providing for breakage of the panel 300 itself. Moreover, as an alternative or in addition to the openable/closeable panel 300 described above, the stitches or other attachment between the panel 300 and the perimeter of the opening 110 may be breakaway stitches or other breakaway attachment that allow the entirety of the panel 300 to release from the canopy when a particular pressure is reached. In this example, the panel 300 may be a simple annular panel without the overlapping portions 303 or the overlapping portions 303 may be provided with selected stitch strengths where portions of the panel open prior to a remaining portion of the panel breaking away or releasing fully from the canopy. In any of these cases, an example attachment for a breakaway panel 400 is described below with respect to FIGS. 4A-4D.

Figure 4A:
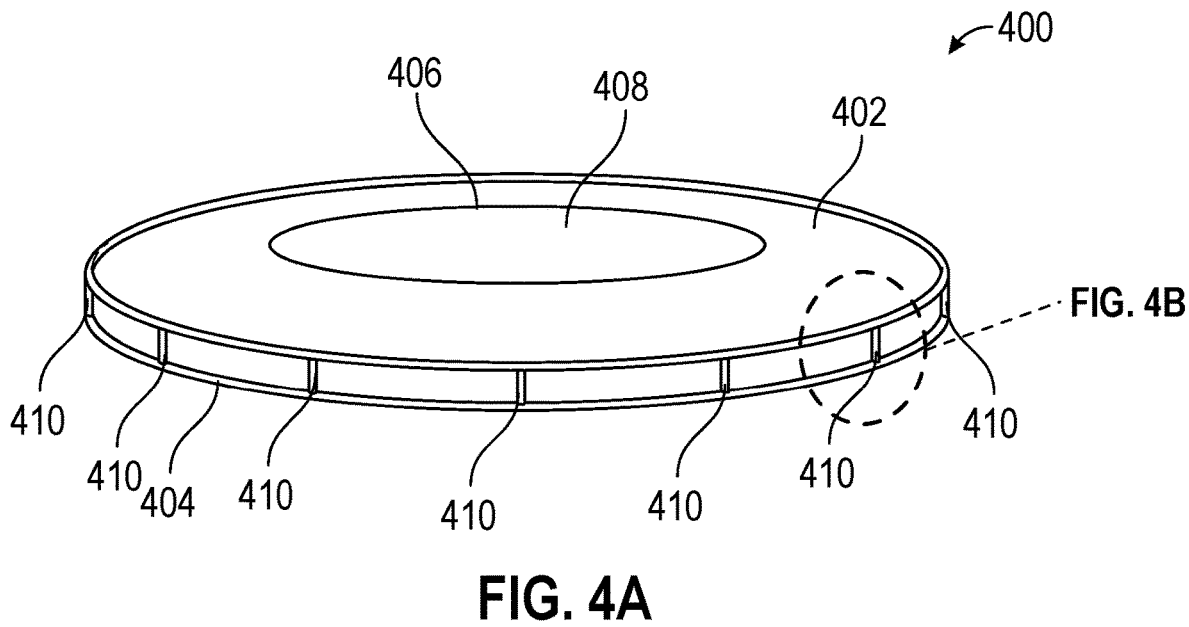
FIG. 4A shows a vent panel secured to a parachute canopy with a plurality of peel connections, in accordance with at least one example of this disclosure.

As with panel 300, panel 400 may be made of a material 402 and have a perimeter 404 that is attached to canopy 102 along the perimeter of main vent 110 or another vent. The panel 400 may have a perimeter 406 that defines an opening 408 with an area smaller than the area of the main vent and through which air may pass during deployment of canopy 102. As discussed with respect to panel 300, a fully occluding panel may also be provided. As shown in FIG. 4A, panel 400 may be connected to canopy 102 at particular locations about its perimeter with a series of peel connections 410. One example of a peel connection is shown in FIG. 4B.

Figure 4B:
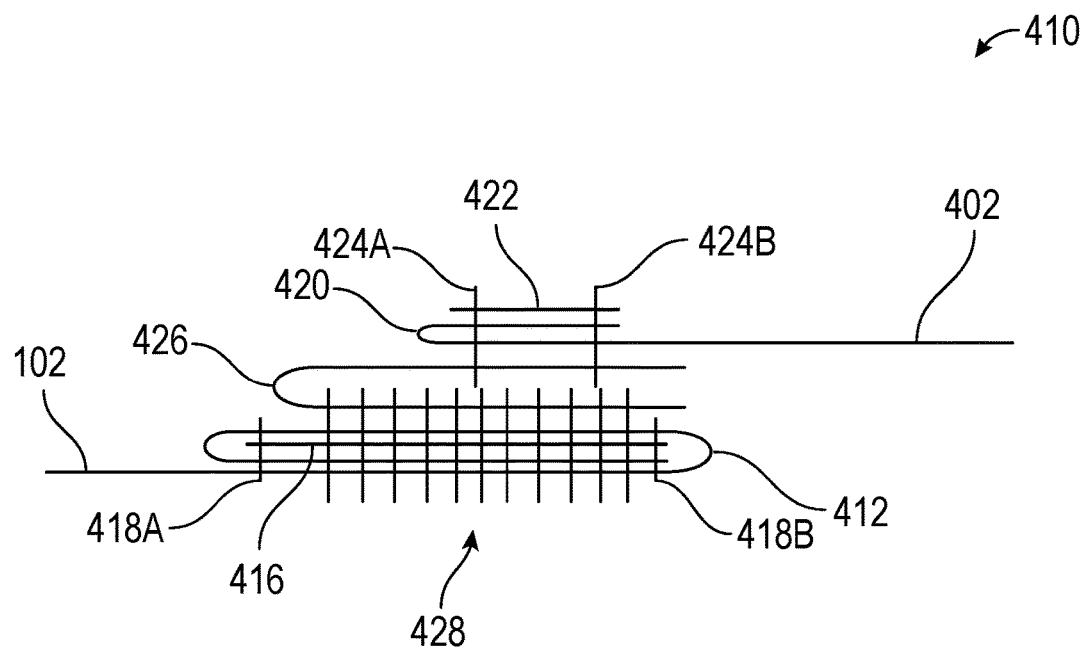
FIG. 4B is a cross-sectional view of a peel connection of the panel of FIG. 4A, in accordance with at least one example of this disclosure.

As shown in FIG. 4B, both the edge of the canopy 102 and the outer perimeter of the panel 400 may include a hemmed and reinforced edge. In particular, the canopy edge at the main vent may include a fold 412 that may encapsulate a reinforcement member 416. Likewise, the panel edge may include a fold 420 and a reinforcement member 422. The reinforcement members 416/422 may be a polymer, thick fabric or other material that may allow one or more threads or stitching 418/424 (labeled individually as 418A/424A and 418B/424B) to pass therethrough and provide reinforcement to the canopy/panel edge to prevent ripping or tearing of the edge and to resist pullout of the threads or stitching 418/424. These reinforced edges on the canopy 102 and the panel 400 may extend around the full perimeter of the main vent 110 and the panel 400, respectively.

A series of peel tabs 426 may be provided about the perimeter of the panel 400 between the panel edge and the canopy edge to create the peel connections 410. As shown, the peel tabs 426 may include a folded member having a bottom portion and a top portion with a fold. The bottom portion may be stitched to the canopy with breakaway stitching and the upper portion may be stitched to the panel 400 with the threads or stitching 424A/B. That is, and as shown, breakaway stitching 428 may pass through the canopy 102 and into the bottom portion of the peel tab 426 to connect the peel tab to the canopy 102, while the hem stitching 424 of the panel 400 may secure the peel tab to the panel 400. As with the panels 200 and 300, the breakaway stitching 428 may be selected to have particular break or break away strengths to allow panel 400 to break away or peel back from the canopy when a particular load is present on the panel 400.

Figure 4C:
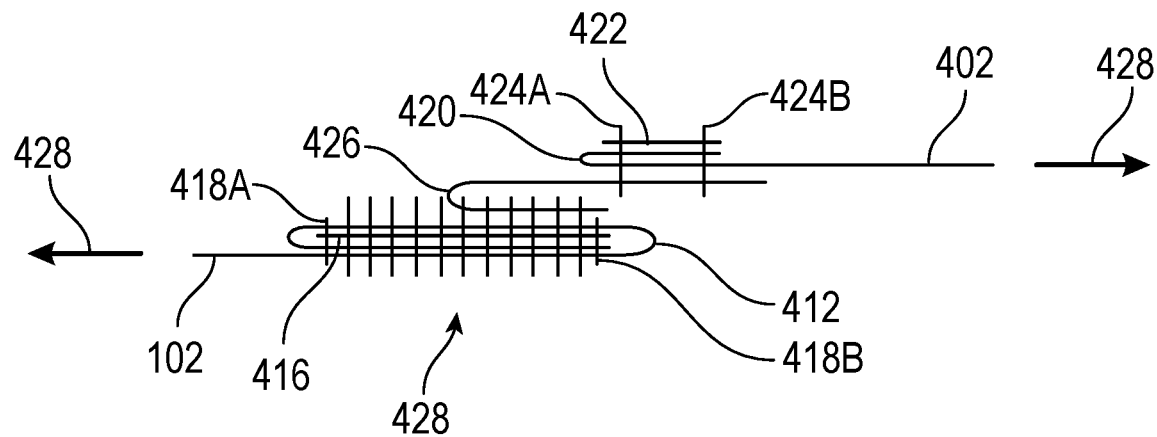
FIG. 4C shows the peel connection of FIG. 4B during breaking thereof, in accordance with at least one example of this disclosure.
Figure 4D:
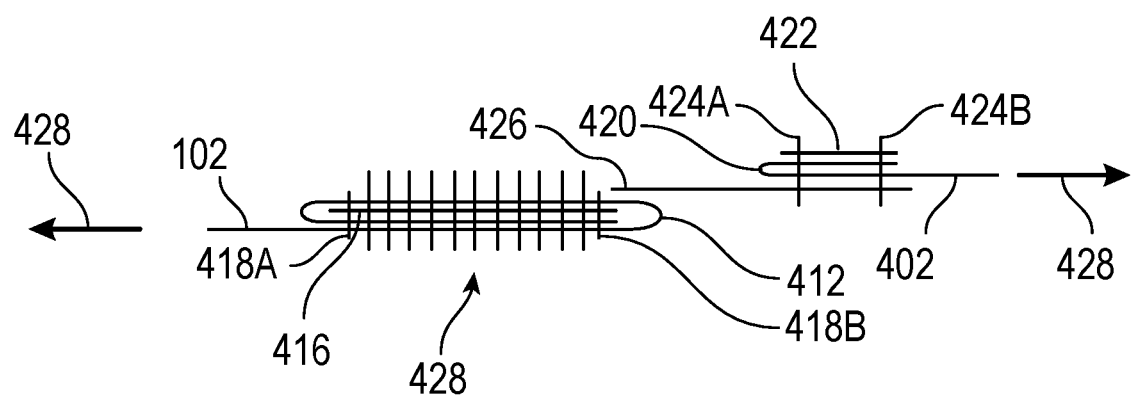
FIG. 4D shows the peel connection of FIG. 4D in a fully broken state, in accordance with at least one example of this disclosure.

FIGS. 4B, 4C and 4D show how the panel 400 may break away under load. That is, with a starting position shown in FIG. 4B and a break away pressure on the panel 400, the outermost threads or stitches 428 may fracture thereby releasing the outer peripheral portion of the peel tab 426 and allowing the peel tab to begin to unfold as shown in FIG. 4C. As the pressure continues to be applied to the panel 400, the peel tab 426 may continue to unfold and may apply tension to the further inward threads or stitches 428 until they fracture or break. When this occurs, the peel tab may fully unfold as shown in FIG. 4D allowing the panel 400 to be released at the respective peel connection 410.

Figure 5A:
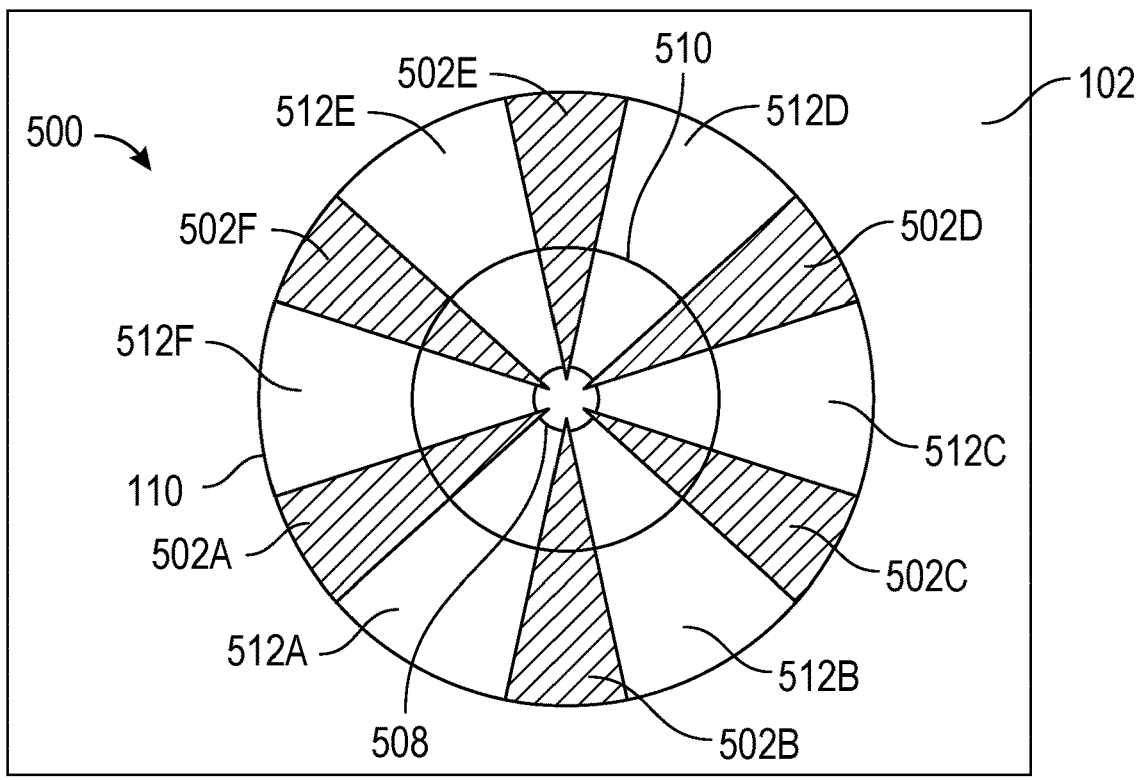
FIG. 5A shows a vent panel in a closed position in accordance with at least one example of this disclosure.
Figure 5B:
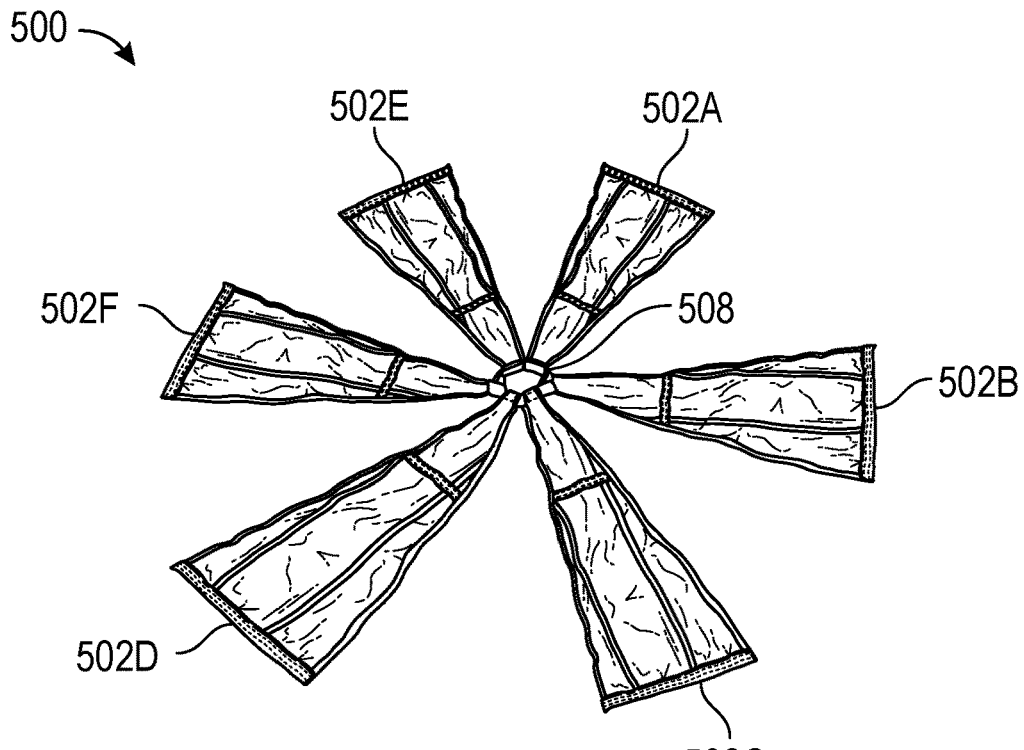
FIG. 5B shows another view of the vent panel of FIG. 5A in accordance with at least one example of this disclosure.
Figure 5C:
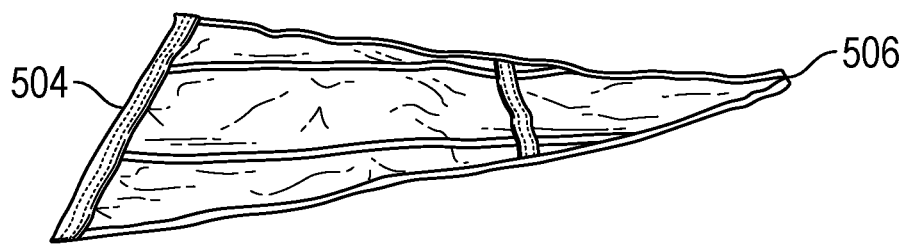
FIG. 5C shows a subpanel of the panel of FIGS. 5A and 5B, in accordance with at least one example of this disclosure.

Still another approach to providing variability in canopy venting is shown in FIGS. 5A, 5B, and 5C. Like panels 300 and 400, panel 500 may be connected to the canopy 102 and may partially block main vent 110 to control a deployment rate of canopy 102. In this example, rather than an annularly shaped panel, panel 500 may include a series of triangular or pie piece shaped subpanels 502 (labeled individually as subpanels 502A, 502B, 502C, 502D, 502E, and 502F). A first or base end 504 (shown in FIG. 5C) of each subpanel 502 may be connected to canopy 102 along the perimeter of the main vent 110. A second or tip end 506 (shown in FIG. 5C) of each subpanel 502 may be connected to a central connector 508. As with the panels previously described, the subpanels 502 may be constructed from the same material as the canopy 102 or another material may be used and the subpanels 502 may be adapted to tear or rip by providing a lower weight material or the panels 502 may be adapted to breakaway as described in more detail below. As also mentioned with respect to the panels previously described, any number of subpanels 502 may be provided and the number of subpanels 502 shall not be limited to the six shown. Still further, while FIGS. 5B and 5C, show panel reinforcing in the form of reinforcing strips within the field of the panels, this reinforcing may or not be present depending on the design requirements and the desired panel strength.

As shown in FIGS. 5A and 5B, the central connector 508 may be arranged at or near the center of the main vent 110 and may be configured to secure the several tip ends of the subpanels 502. Moreover, the central connector may be particularly configured to deform such as by stretching, breaking, or fracturing under particular internal canopy pressures thereby releasing the tip ends 506 of the several subpanels allowing them to flap open and increase the open area of the main vent 110. This may occur in stages or all at once. The central connector 508 may be a ring that has a circular, oval, octagon, hexagon, or other shape. The central connector 508 may extend through loops or sleeves on the tip ends 506 of the several subpanels 502 or a tab or other tie may be provided. The central connector may have a tensile strength selected to deform such as by stretching or breaking under a particular internal canopy pressure to release the panels. That is, for example, the connector 508 may be made of a polymer or other material having a selected size and tensile strength. Alternatively or additionally, the central connector may be configured to stretch to allow the subpanels to deflect and increase the open area of the main vent 110 without the central connector breaking such that the subpanels refrain from flapping fully open, for example. In this example, the vent size may increase when the parachute is pulled through the air at high speeds, but may return to the original size as the parachute slows down. In one or more examples, multiple central connectors 508 may be provided with different breaking strengths. A weaker of the central connectors may be secured to all of the subpanels and a stronger of the central connectors may be secured to only some of the subpanels. As such, when the weaker of the central connectors breaks, it will release all of the subpanels, but the stronger of the central connectors main retain a subset of the subpanels in position unless/until a higher internal pressure develops. In this example, the weaker of the central connectors may be slightly smaller than the stronger central connector so as to see the load from the subpanels before the stronger central connector does. Other geometric approaches to controlling loading order may be provided. In any case, multiple stages of breakaway may be provided with a series of central connectors.

Alternatively or additionally and as shown in FIG. 5A, an additional intermediate connector 510 may also be provided. This connector 510 may have a strength different than the central connector 508. For instance, one or more sections of first connector 508 may have a smaller diameter that weakens connector 508 such that first connector 508 fractures when the aircraft is traveling at a low or intermediate speed and canopy 102 is deployed (e.g., at slow speeds, both connectors 508 and 510 may remain intact, so this example is suggesting an elevated speed, but not high speed). Intermediate connector 510 may have a larger cross-sectional diameter than first connector 508 and, thus, a larger tensile stress may fracture the intermediate connector. As such, when the aircraft is traveling at a high rate of speed, both first connector 508 and second connector 510 may fracture thereby slowing the inflation rate of canopy 102. It is to be appreciated that once the central connector 508 breaks, more air may be allowed through the vent, so the internal canopy pressure may decrease. As such, where intermediate connector 510 is the same strength as central connector 508, the central connector 508 may break and the intermediate connector 510 may not. As such, different strengths of the connectors may or may not be used.

Figure 6:
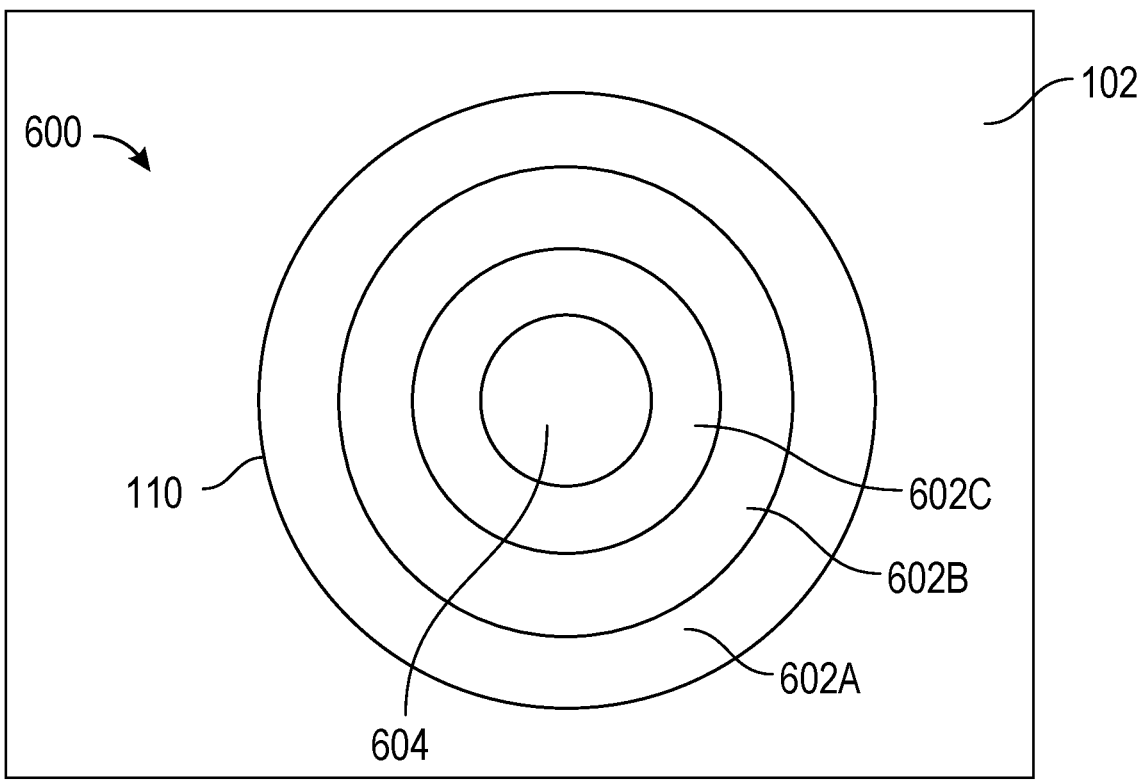
FIG. 6 shows another vent panel in accordance with at least one example of this disclosure.

While FIGS. 5A, 5B, and 5C shows subpanels 502 having a triangular or pie piece shape, subpanels 502 can have different shapes. For example, as shown in FIG. 6, a panel 600 may have subsections 602 (labeled individually as subsections 602A, 602B, and 602C) that are annular and form a series of concentric sections of material. One of subsections 602, e.g., subsection 602C, may define an opening 604 that allows air to pass through canopy 102. Each of subsections 602 may be stitched together such that the stitching fractures as a function of the internal pressure within canopy 102. In one or more examples, the stitching between the subsections may be the same or similar to that shown with respect to FIGS. 4A-4D. Other connections or stitching may also be provided.

It is to be appreciated that while generally flat panels have been shown throughout FIGS. 2B-6 or panels that generally follow the contour of the canopy, other shapes for the panels may be provided. That is, the panels (e.g., 204, 300, 400, 500, subpanels 502, 600, subpanels 602) may have a contour different than that of the surrounding canopy. For example, the panels may be pouched, tented, ballooned, or otherwise adapted to catch air and take on one of the described shape. In one or more examples, this may increase the surface area of the panel when compared to a flat panel and/or it may change the loading condition on the panel itself or on the breakaway stitching, for example. Still other contours for the panels may be provided.

In operation and use, the vents/panels described herein may function to control the loads on the parachute system and the payload both on-the-fly and automatically. To understand how this works, a brief discussion of parachute deployment is provided. FIGS. 7A-7E, show several stages of canopy deployment. During a first stage 702, canopy 102 may be pulled away from payload 108 via rocket extraction and/or mortar ejection, or a drag chute 704 may be used. As payload 108 drags canopy 102 through the air, air enters canopy 102 via an opening 706 defined by a skirt band 109 of canopy 102. While the canopy 102 may include a main vent 110 on a top side of the canopy, the open area of the main vent relative to the skirt band 109 may be relatively small. That is, at initial deployment, the open area defined by the skirt band 109 may be controlled by the slider, which may be positioned adjacent the skirt band 109. Nonetheless, while the size of the skirt band may be controlled by the slider it is, nonetheless, still true that the main vent opening is relatively small compared to the area defined by the skirt band. As such, and as air enters canopy 102, more air may enter the canopy than exits it and canopy 102 may begin to inflate as shown in stage 710. As canopy 102 inflates, opening 706 may increase in size as shown in stage 712. The increase in size of opening 706 may be limited by the slider size and geometry since it is position adjacent the skirt band 109. Over time, the pressure on the canopy may cause slider 106 to begin sliding from a first position proximate skirt band 109 to a second position shown in stage 714 and then further to another position proximate payload 108 as shown in stage 716. Slider 106 is not shown in stages 702, 710, and 712 for clarity, but is understood to be adjacent the skirt band 109 in these stages. The slider 106 may, thus, aerodynamically reef the parachute and extend the time over which the parachute opens thereby limiting inflation loads. Where deployment speeds and elevations are known for a given payload, the parachute size, the vent size, and the slider size may all be selected to provide for appropriate canopy inflation rates and loading. However, where, for example, speeds and elevations are not known, the vents/panels described herein may allow for on-the-fly and automatic adjustment of the system to provide for suitable inflation rates and loading. This can be particularly useful for parachute systems used on aircraft because deployment speeds and elevations may vary depending on the use of the aircraft when an engine failure or other malfunction occurs.

Referring again to FIGS. 7A and 7B, the vents/panels may be designed to react to inflation loads at an early stage of parachute deployment. That is, for example, at stage 702 may reflect the peak loading condition on the internal surface of the apex of the canopy. As such, the internal pressures within the canopy may trigger the functionality of one or more panels on the canopy and this functionality may be based mainly on the speed at which the parachute is being dragged through the air. Where the parachute is being deployed at high speeds, the internal pressures will likewise be high and can cause one or more of the panels to open and/or breakaway from the canopy. This will allow more air to exit the canopy and will slow the rate at which the canopy inflates, thus, avoiding imparting excessive loads on the parachute system and the payload. On the other hand, where the parachute is being deployed at low speeds, the internal pressures will likewise be low and, as such, the one or more panels may remain intact, thus, maintaining more air within the canopy and allowing the canopy to inflate at its normal rate. Still further, where the parachute is being deployed at an intermediate speed, the internal pressures will likewise be intermediate and may cause some, but not all, of the panels to open and/or breakaway from the canopy or may cause one or more panels to partially open or breakaway. This will allow some air to escape the canopy, but not as much as if all the panels had opened or broken away. As such, an intermediate inflation rate of the canopy may be provided while still controlling the loading on the parachute system and the payload.

It is to be appreciated that the vent/panel systems described herein are separate and apart from the slider and may be used with or without a slider. Where a slider is used, the vent/panel system may control the initial inflation rate and, together with the slider may control opening rate of the skirt after the parachute is inflated. That is, where the vents/panels open, the initial inflation rate (e.g., stages 702-714) will be slower and the rate at which the canopy transitions from 714 to 716 may also be slower. On the other hand, where the vents/panels remain closed, the initial inflation rate (e.g., stages 702-714) will be faster as will the process from fully inflated to fully inflated and fully open (e.g., 714-716).

In the context of aircraft parachutes, an airplane may travel at relatively slow speeds when it is closer to the ground such as when taking off or landing. In the event of engine failure or other malfunction in these circumstances, a quickly opening parachute may be desired so as to quickly place the aircraft in a slowly descending condition before impacting the ground. In contrast, and at higher altitudes, an aircraft may travel at much higher speeds. In the event of engine failure or other malfunction in these circumstances, a quickly opening parachute may damage the parachute system and/or the aircraft. Moreover, given the higher altitude, more time may be available to open the parachute. The vents/panels described herein may allow for automatically and on-the-fly adjustment of the canopy inflation rate to accommodate the above conditions and conditions in between. That is, at slow speeds, the vent/panel system may remain closed and provide for a relatively fast inflation and opening rate, which may accommodate a slow-moving aircraft at a low altitude. At high speeds, the vent/panel system may break open and provide for lower loads on the system and aircraft by establishing a slower inflation and opening rate, which may take advantage of the higher altitude to deal with the higher speed. That is, the higher altitude may allow for a greater amount of time to get the parachute open, so slowing the inflation/opening rate may take advantage of that to lower the loads on the system and aircraft.

The combination of one or more of the above vent/panel and slider systems may allow the parachute to be utilized under a wide variety and range of conditions including one of or any combination of all of the following conditions: high or low airspeeds, low or high payloads, and all varying altitudes at which a payload may need parachute support.

Load Distributing Line Guide

Figure 7A:
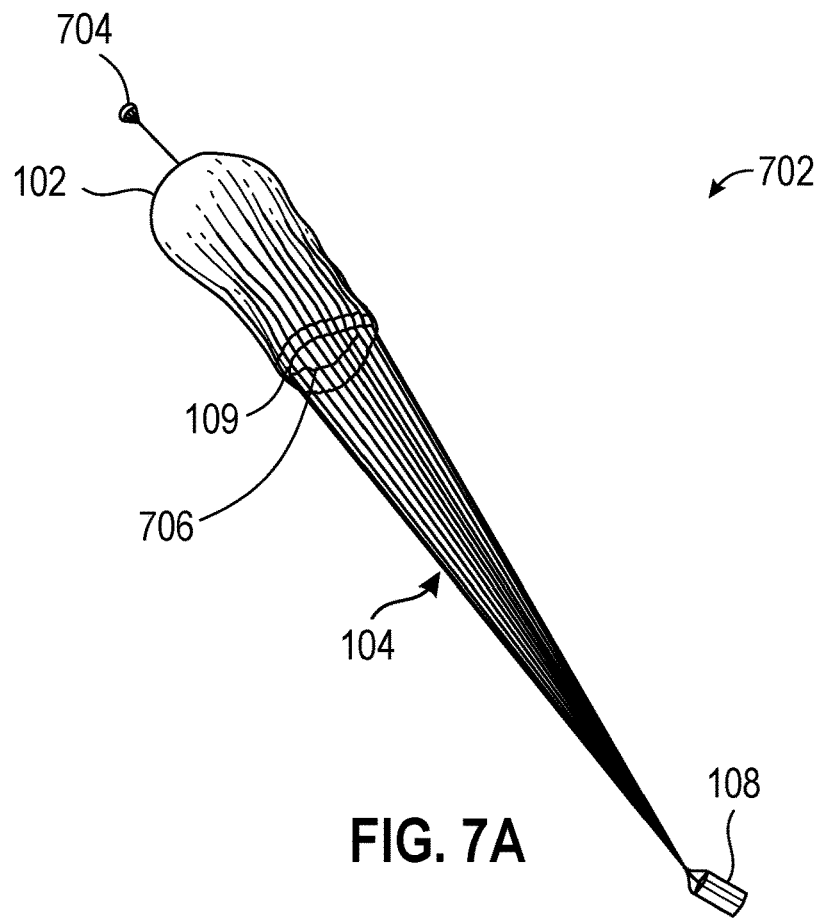
FIGS. 7A, 7B, 7C, 7D, and 7E each show respective stages of a canopy deployment in accordance with at least one example of this disclosure.
Figure 7B:
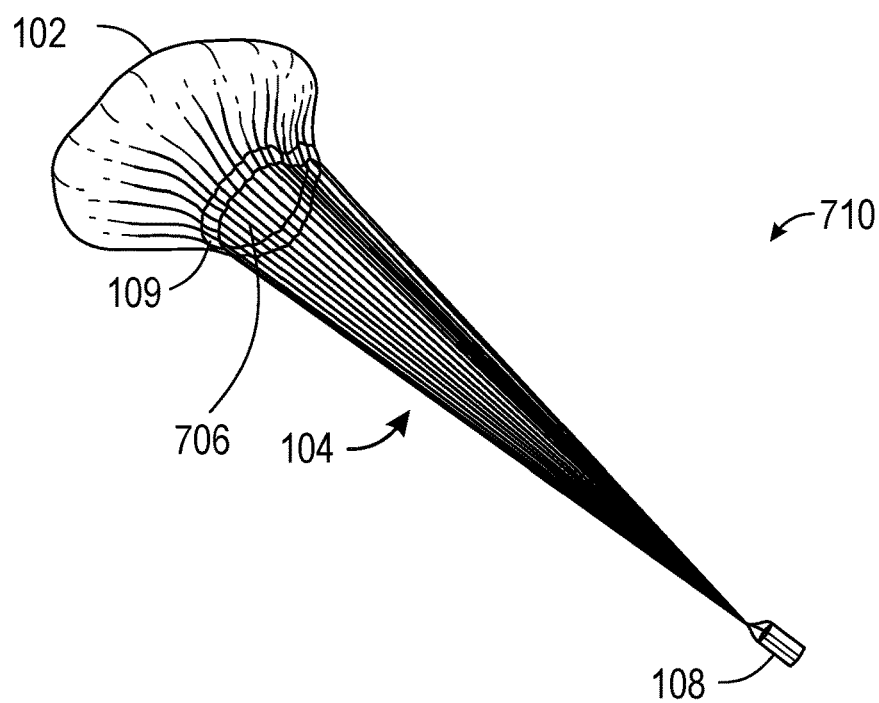
Figure 7C:
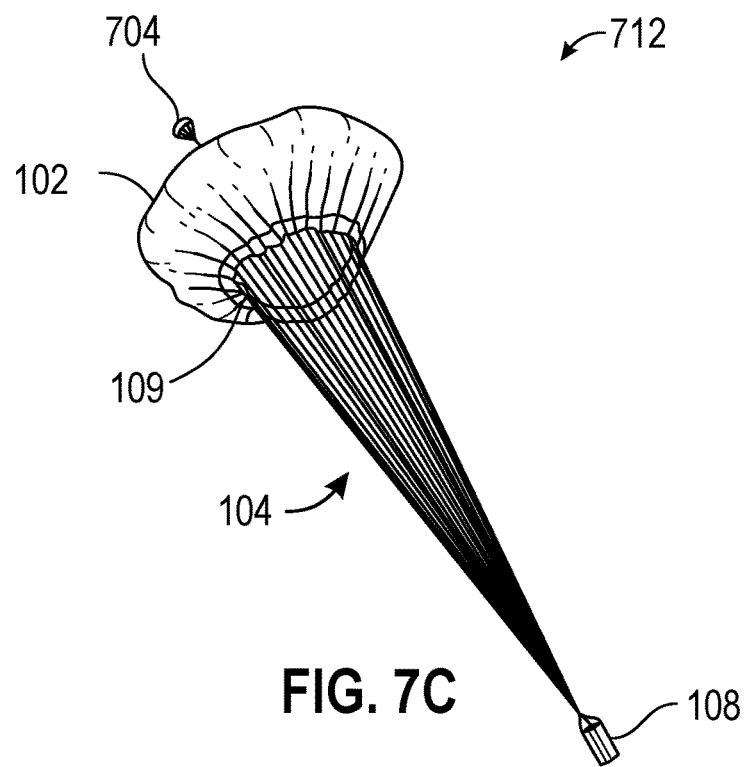
Figure 7D:
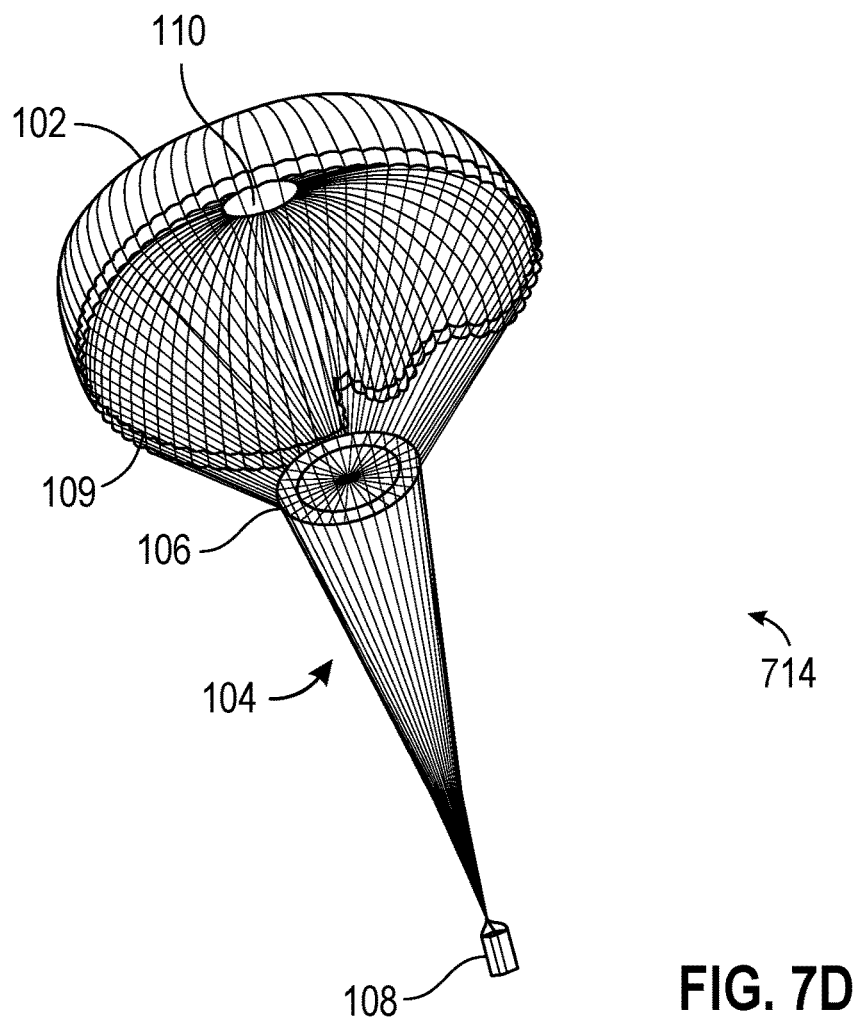
Figure 7E:
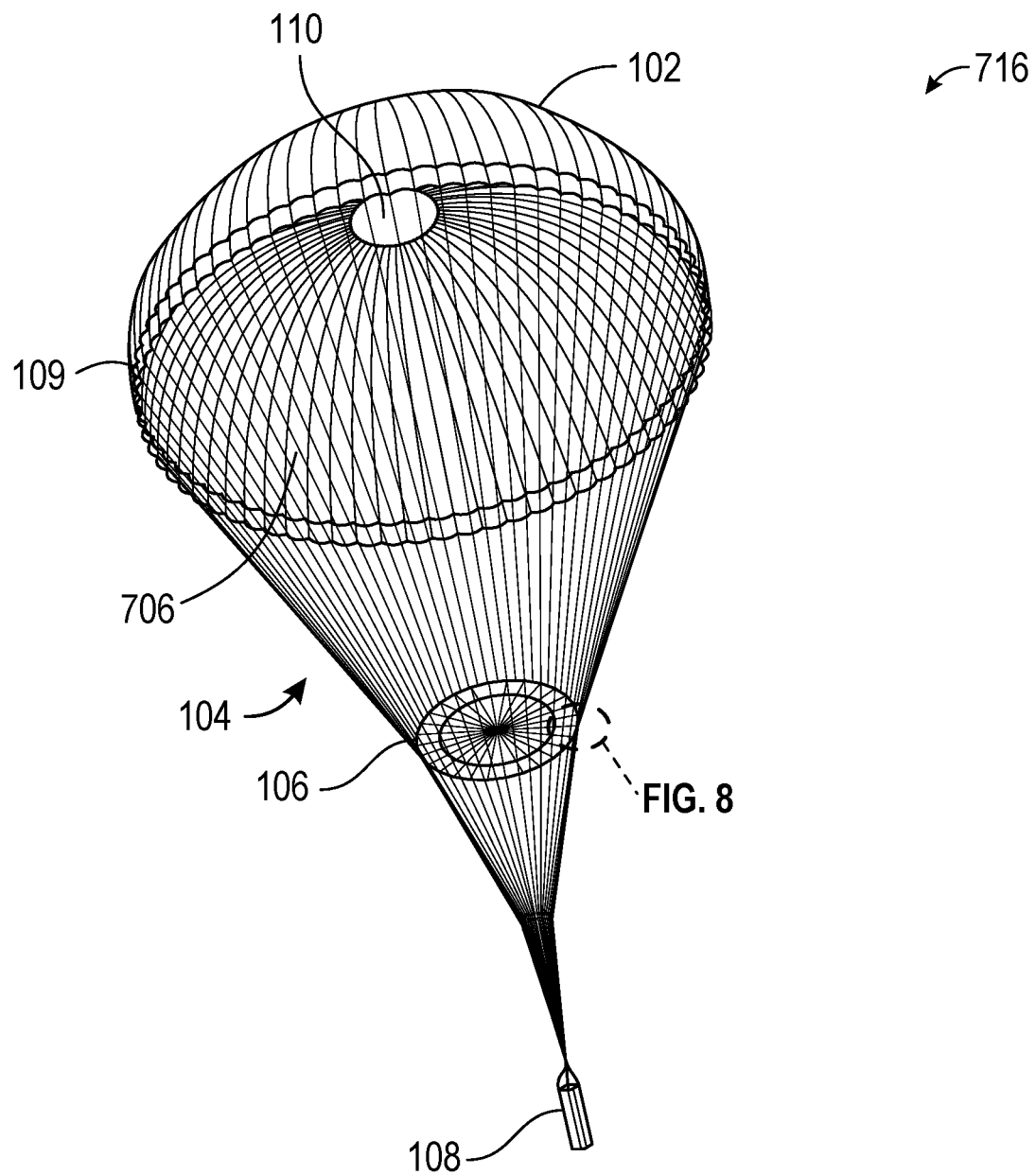

As discussed with respect to FIGS. 7D and 7E, the parachute system may include a slider 106 that may help to control the opening rate of the parachute. That is, the slider 106 described above may be configured to aerodynamically reef the parachute and limit inflation loads. In one or more examples, the suspension line interfacing elements of the slider may include load distributing line guides. That is, rather than metal grommets or rings, a line guide configured to accommodate high modulus suspension lines may be provided.

Figure 8:
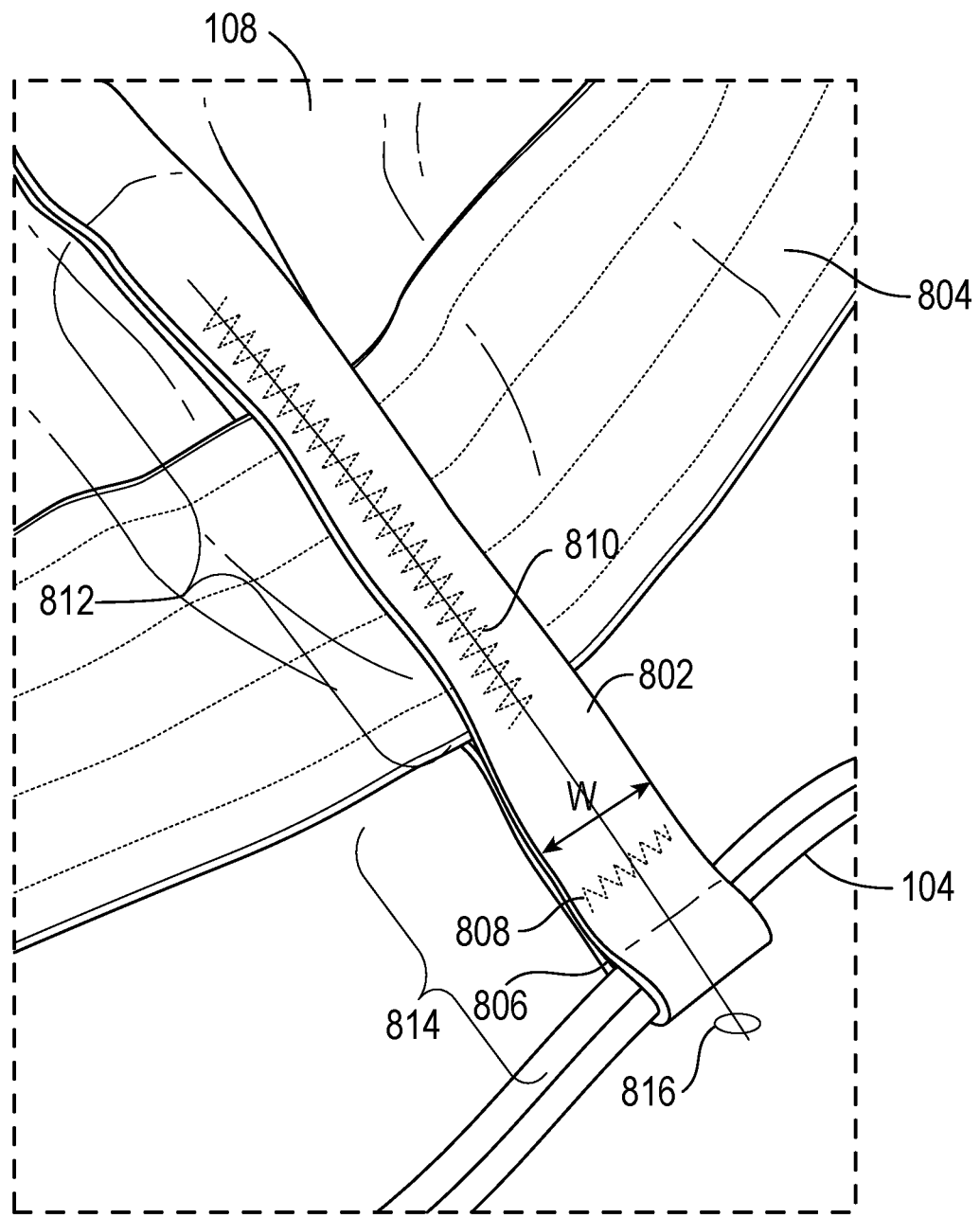
FIG. 8 shows a flexible loop of a slider in an unloaded or natural position in accordance with at least one example of this disclosure.

FIG. 8 shows one example of a load distributing line guide in the form of a flexible loop 802. The flexible loop may be configured to slidably secure the slider 106 to a suspension line 104. That is, during transitions from a first state proximate skirt band 109 (see FIG. 7C) to a second state proximate payload 108 (see FIG. 7E), the flexible loops 802 may allow slider 106 to slide along suspension lines 104. Moreover, the flexible loop 802 may be configured to transfer, to the slider, the outward component of force imparted by the suspension lines. In collecting the force to be transferred, the slider 106 may distribute the force along a length of the suspension line to help avoid breaking or damaging the suspension line. The flexible loop may provide for a sliding action at a reduced friction on the suspension lines. As shown in FIG. 8, the flexible loop 802 may include an attachment portion 812 and a securing portion 814.

The attachment portion 812 may be configured for securing the flexible loop 802 to the slider 106. In one or more examples, the attachment portion may include a relatively elongate strip of material extending across the surface of the slider and defining a longitudinal axis 816. The attachment portion 812 may be sewn or stitched to the slider with a stitch 810. The stitch may be designed to transfer tensile loads in the flexible loop 802 to the slider and may include a zig zag stich in combination with a longitudinal stitch as shown and the stitch may extend over a relatively long length of the attachment portion. Still other stitch patterns may be provided. In some examples, a strip may be provided on a top side and a bottom side of the slider and the stitch may pass through the top strip, through the slider, and through the bottom strip. In still additional examples, the strip on a top side, a bottom side, or both, may extend all the way across the slider to a securing portion on an opposite side of the slider. That is, for example, where an even number of suspension lines are provided, a pair of securing portions on opposite sides of the slider may be connected by a single attachment portion. The attachment portion may include a textile fabric. In one or more examples, the textile fabric may be both low in elasticity and high in tensile strength. In particular, the attachment portion may include a poly-paraphenylene terephthalamide (trade name KEVLAR®) or an aromatic copolyimide (trade name TECHNORA®) material. Still other materials or combinations of such materials for the attachment portion may be provided.

The securing portion 814 may extend from the attachment portion 812 and be configured to capture lateral loads from the suspension lines 104 and, in particular, do so in a distributed fashion. (e.g., as opposed to a point load fashion). As shown, the securing portion 814 may extend radially outward relative to the slider 106 from the attachment portion 812. The securing portion 814 may include a loop or through hole 806 formed by folding a strip of material over and onto itself and sewing or otherwise providing a stitch 808 at a distance from the fold. In one or more examples, the securing portion 814 may be the same strip of material that forms the attachment portion 812. Where a top and bottom strip are provided for the attachment portion, the entire flexible loop 802 may be formed from a single strip of material with a fold. A stitch 808 may be provided at a distance from the fold to create the loop or through hole 806 and define a top tail and a bottom tail, which may form the top/bottom strips of the attachment portion. For that matter, a double ended flexible loop 802 with a loop or through hole at both ends may be provided with a single strip of material. The securing portion 814 may be formed from the same material or a different material than the attachment portion 812.

Flexible loop 802 may form a substantially flap strap having a width, W, that allows bending forces to be distributed over a greater area than a comparable metal grommet, for example. As shown in stage 714, when slider 106 is located proximate skirt band 109, suspension lines 104 may be bent at sharp angles. It is to be appreciated that the shallow angle in the portion of the suspension line between the slider 106 and the skirt 109 may generate a high component of force in a direction parallel to the slider 106 and, as such, a high component of force acting transversely across the suspension line 104 at the bend in the suspension line. High modules suspension lines, such as poly-paraphenylene terephthalamide (trade name KEVLAR®) or an aromatic copolyimide (trade name TECHNORA®) may have a tendency to break due to the focused radial load created by metal or other inflexible grommet materials.

Figure 9:
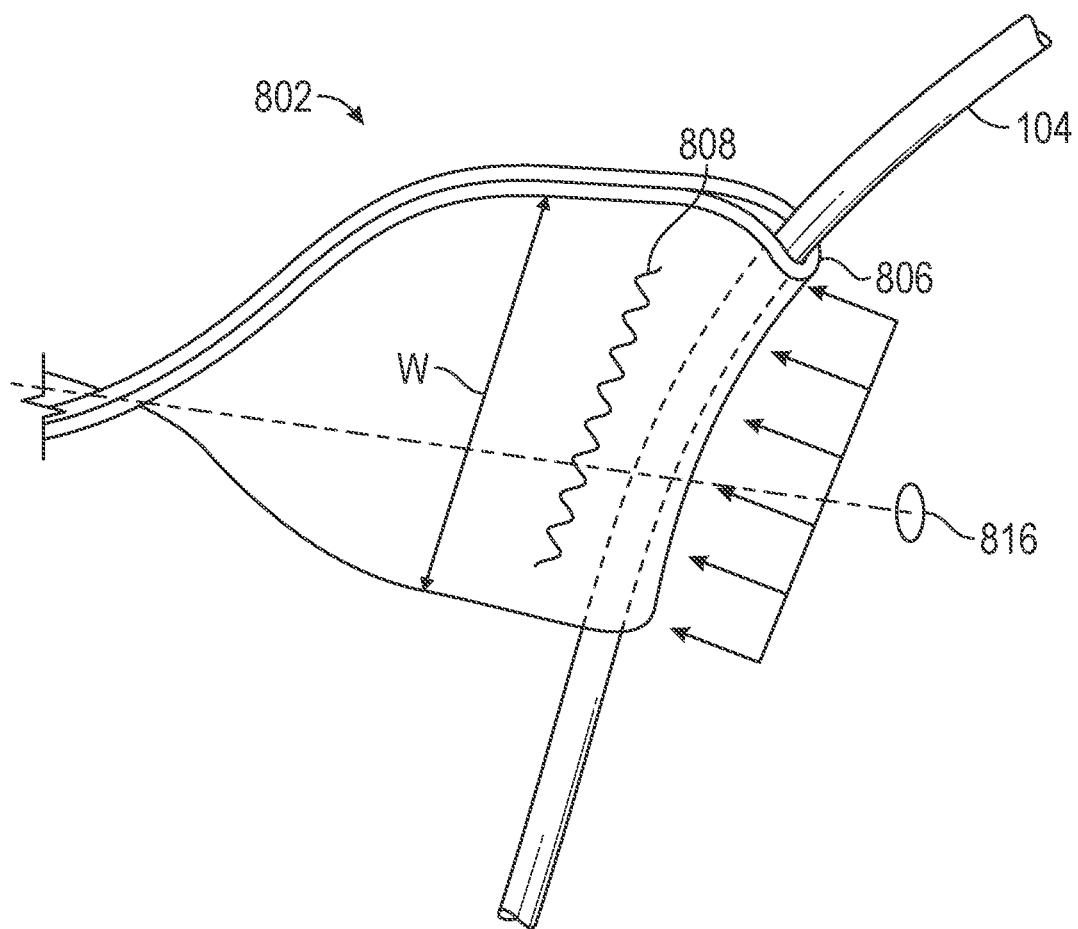
FIG. 9 shows the flexible loop of FIG. 8, but in a loaded position, in accordance with at least one example of this disclosure.

In contrast, and as shown in FIG. 9, when the flexible loop 802 is provided, the securing portion 814 and loop or through hole 806 may rotate about the longitudinal axis 816 of the attachment portion 812 and may be arranged in a loaded position that is approximately 90 degrees to its unloaded or natural position shown in FIG. 8. As such, the loop 806 may extend along the suspension line 104 for a distance W and the load imparted on the suspension line by the flexible loop 802 may be distributed over the distance W. Moreover, due to the flexible nature of the flexible loop material, the loop or through hole 806 may deform along the suspension line 104 and, thus, avoid, reduce, and/or minimize point loads on the suspension line 104. In one or more examples, the loop may slide more freely along the suspension line. That is, the deformable nature of the loop 806 may allow the loop to conform to the curvature of the suspension line 104 even as that curvature changes during the disreefing process (i.e., as the slider 106 moves down the suspension lines 104 and the amount of bend in the suspension line decreases—compare FIG. 7D to 7E).

By using flexible loops 802, lighter weight high modulus suspension lines can be used to reduce overall parachute weight. Flexible loops 802 may also be made of the lighter weight high modulus materials. Flexible loops 802 may also be made of materials such as nylons, polyethylene, polypropylene, polyolefin, etc. In some examples, flexible loops 802 and/or suspension lines 104 may be impregnated or coated with a lubricant to lower the coefficient of friction between flexible loops 802 and suspension lines 104. Polymer inserts, which are flexible and may be impregnated or coated with a lubricant, may be inserted into through hole 806 to assist in displacing radial loads and/or lowering friction between flexible loops 802 and suspension lines 104 to allow the slider to move along the suspension lines more freely. Still other inserts that are harder than polymer inserts, but remain flexible (such as by being thin) may also be provided. Still other approaches to reducing the friction between the flexible loops 802 and the suspension lines 104 may be provided.

ADDITIONAL NOTES

The following, non-limiting examples, detail certain aspects of the present subject matter to solve the challenges and provide the benefits discussed herein, among others.

Example 1 is a parachute comprising: a canopy defining a vent having a perimeter defining an open area of the canopy; a panel arranged to cover at least a portion of the open area in a closed condition, the panel being attached to the canopy at or near the perimeter of the vent; and a connector secured to the panel and configured to control a transition of the panel from the closed condition to an open condition by being deformable based on an internal pressure within the canopy.

In example 2, the subject matter of example 1 optionally includes wherein being deformable comprises having a design breaking strength selected to break under a particular internal pressure.

In example 3, the subject matter of any one or more of examples 1-2 optionally include wherein the connector is a ring.

In example 4, the subject matter of any one or more of examples 1-3 optionally include wherein the panel comprises a plurality of subpanels extending from the perimeter of the vent to a central area of the vent and a ring connects the plurality of subpanels to one another at the central area.

In example 5, the subject matter of any one or more of examples 1-4 optionally include wherein the connector comprises multiple rings with different breaking strengths.

In example 6, the subject matter of any one or more of examples 1-5 optionally include wherein the first connector is at least one stitch.

In example 7, the subject matter of any one or more of examples 1-6 optionally include wherein the panel, in the closed condition, forms an annular disk and, in an open position, forms a cylinder extending from the canopy.

Example 8 is an airplane comprising the parachute canopy of any one or more of claims 1-7.

Example 9 is a slider for use with a parachute, the slider comprising: an annular body including an edge; and a plurality of material strips attached to the annular body at or near the edge and extending radially outward from the edge, each of the plurality of material strips forming a through hole beyond the edge configured to slidably receive a suspension line of the parachute, wherein the plurality of material strips each have a width that, during a transition of the slider from a reefing state to a non-reefing state, distributes a radial load along a length of the suspension line.

In example 10, the subject matter of example 9 optionally includes wherein the plurality of flexible loops comprise an attachment portion and a securing portion, the through hole being in the securing portion, forming a substantially flat strap in an unloaded or natural position.

In example 11, the subject matter of any one or more of examples 9-10 optionally includes wherein in a loaded position, the securing portion rotates approximately 90 degrees about a longitudinal axis of the attachment portion.

In example 12, the subject matter of any one or more of examples 9-11 optionally includes wherein the plurality of flexible loops comprise a textile.

In example 13, the subject matter of any one or more of examples 9-12 optionally includes wherein the flexible loop is deformable to conform to a curvature of the suspension line.

In example 14, the subject matter of any one or more of example 9-13 optionally includes wherein the textile comprises at least one of a poly-paraphenylene terephthalamide, an aromatic copolyimide, or combination thereof.

In example 15, the subject matter of any one or more of examples 9-14 optionally includes wherein each of the plurality of flexible loops comprise a single strip of material with a fold and a stitch placed at a distance from the fold to form the through hole.

In example 16, the subject matter of any one or more of examples 9-15 optionally includes wherein a top and a bottom tail of the single strip are secured to a top and a bottom side of the annular body to form an attachment portion.

Example 17 is an airplane comprising the slider of any one or more of examples 9-16.

Example 18 is a parachute comprising: a plurality of suspension lines; a slider comprising an annular body and a plurality of material strips attached to the annular body, each of the plurality of material strips forming a through hole configured to receive a suspension line of the plurality of suspension lines, the plurality of material strips having a width that, during a transition of the slider from a first state to a second state, distributes a radial load along a length of the suspension line; a canopy coupled to the plurality of suspension lines and defining a vent having a perimeter defining an open area of the canopy; a panel arranged to cover at least a portion of the open area in a closed condition, the panel being attached to the canopy at or near the perimeter; and a connector secured to the panel and configured to control a transition of the panel from the closed condition to an open condition by being deformable based on an internal pressure within the canopy.

In Example 19, the subject matter of example 18 optionally includes wherein the connector is a ring.

Example 20 is an airplane comprising the parachute of any one or more of claims 17-18.

In Example 21, the sliders, parachutes, parachute canopies, airplanes, or any combination of Examples 1-20 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A slider for use with a parachute, the slider comprising:
   an annular body including an edge; and
   a plurality of material strips attached to the annular body at or near the edge and extending radially outward from the edge, each of the plurality of material strips forming a through hole beyond the edge configured to slidably receive a suspension line of the parachute, wherein the plurality of material strips each have a width that, during a transition of the slider from a reefing state to a non-reefing state, distributes a radial load along a length of the suspension line.

2. The slider of claim 1, wherein the plurality of material strips comprise an attachment portion and a securing portion, the through hole being in the securing portion, forming a substantially flat strap in an unloaded or natural position.

3. The slider of claim 2, wherein in a loaded position, the securing portion rotates approximately 90 degrees about a longitudinal axis of the attachment portion.

4. The slider of claim 1, wherein the plurality of material strips comprise a textile.

5. The slider of claim 4, wherein the plurality of material strips are deformable to conform to a curvature of the suspension line.

6. The slider of claim 4, wherein the textile comprises at least one of a poly-paraphenylene terephthalamide, an aromatic copolyimide, or combination thereof.

7. The slider of claim 1, wherein each of the plurality of material strips comprise a single strip of material with a fold and a stitch placed at a distance from the fold to form the through hole.

8. The slider of claim 7, wherein a top and a bottom tail of the single strip are secured to a top and a bottom side of the annular body to form an attachment portion.

9. An airplane comprising the slider of claim 1.

10. A slider for use with a parachute, the slider comprising:
    an annular body including an outer peripheral edge; and
    a plurality of flexible loops formed from textile material strips and having a first end and a second end defining a length, the first end attached to the annular body at or near the outer peripheral edge and the second end being folded to form a through hole at a location beyond the outer peripheral edge,
    wherein:
    the through hole is configured to slidably receive a suspension line of the parachute, and
    the strip of material has a width measured generally perpendicular to the length that, during disreefing, distributes a radial load along a length of the suspension line.

* * * * *